United States Patent [19]
Drake et al.

[11] Patent Number: 5,280,718
[45] Date of Patent: Jan. 25, 1994

[54] TRANSDUCER HEALTH AND OFFSET CALIBRATION PROCESSING SYSTEM

[75] Inventors: John W. Drake, Cincinnati, Ohio; David J. Pcsolar, Greer; James A. Wood, Spartanburg, both of S.C.

[73] Assignee: Westinghouse Air Brake Company, Wilmerding, Pa.

[21] Appl. No.: 923,678

[22] Filed: Aug. 3, 1992

[51] Int. Cl.$^5$ .................................................. G01L 5/28
[52] U.S. Cl. ........................................ 73/129; 188/1.11
[58] Field of Search ........................ 73/129, 4 R; 364/424.03, 426.01, 426.05; 188/1.11, 34

[56] References Cited
U.S. PATENT DOCUMENTS 4,520,663  6/1985  Moore et al. ............................ 73/129
4,979,391  12/1990  Drake et al. ............................ 73/129

Primary Examiner—Jerry W. Myracle
Attorney, Agent, or Firm—John B. Sotak

[57] ABSTRACT

A transducer health and offset calibration processing arrangement for a multiple axle railway vehicle including a brake cylinder transducer correction function circuit coupled to a stuck/dragging brake signal terminal, a brake command signal terminal, and a power/brake trainline signal terminal. A zero speed latch circuit and a transducer circuit interface health check circuit connected to a zero speed signal terminal. A first three-input AND gate connected to the zero speed signal terminal, a snowbrake trainline signal terminal, and a Servotrol output signal terminal. A second three-input AND gate coupled to the output of the first three-input AND gate and a highest axle speed signal terminal. A minimum axle rate discriminator circuit connected to each of plurality of axle rate signal terminals of the multiple axles of the railway vehicle. A brake cylinder pressure circuit check and a brake cylinder pressure signal generator coupled to a truck brake cylinder pressure signal terminal. The brake cylinder pressure signal generator, a transducer circuit interface health check circuit, and the transducer cylinder transducer correction function circuit coupled to a timer input signal terminal. A transducer offset initialization function circuit connected to a cold start input terminal. The minimum axle rate determination circuit having an output connected to the second three-input AND gate which has an output connected to a check and recalibrate enable function circuit.

14 Claims, 3 Drawing Sheets

5,280,718

TRANSDUCER HEALTH AND OFFSET CALIBRATION PROCESSING SYSTEM

FIELD OF THE INVENTION

This invention relates to a transducer health and offset calibration processing arrangement and, more particularly, to a unique electronic monitoring circuit employing pattern fault recognition along with an intelligent diagnostic matrix for determining the operational status or functional condition of transducer input signals.

BACKGROUND OF THE INVENTION

A previous electronic dynamic diagnostic arrangement is shown and described in U.S. Pat. No. 4,979,391, issued on Dec. 25, 1990, entitled "Transducer Operational Fault Determination System" which is incorporated by reference to the present application. Briefly, the transducer fault detection arrangement includes a first logic network connected to a low level pressure offset circuit and to an operational transducer-to-transducer equivalence check circuit. The low level pressure offset circuit is connected to a second logic network while operational transducer-to-transducer equivalence check circuit is connected to an operational transducer-to-transducer comparison check circuit. The second logic network is connected to a pair of transducer offset test check circuits which are connected to a third logic network. The third logic network is connected to a pair of high level transducer fault detector circuits for distinguishing a transducer failure from a faulty dragging and/or stuck brake condition. This previous transducer fault detection circuit functioned only to provide system annunciation that a transducer had drifted toward a positive offset condition. The prior system did not provide any offset compensation for the transducer signal which could lead to erroneous values being taken for the brake cylinder pressure. In the past, there was no system in existence that would provide the full scope of information made available which coped with either or both a dynamic and/or a static environment.

OBJECTS AND SUMMARY OF THE INVENTION

Accordingly, it is an object of this invention to provide a transducer health and offset calibration processing circuit which can dynamically and/or statically differentiate between an internal problem developed in the electronic circuitry of the transducer as well as an external problem that is produced by the transducer.

Another object of this invention is to provide an improved transducer health and offset calibration system which is capable of determining and compensating for a transducer that has drifted to a positive offset and also which is capable of determining and compensating for a transducer that has drifted to a negative offset.

A further object of this invention is to provide a transducer health and offset calibration arrangement which can intelligently discern and provide corrective action which will enable a brake release state when a vehicular brake release condition is warranted.

Yet another object of this invention is to provide a unique transducer health and offset calibration processing system which is capable of providing the diagnostic insight for the end user to diagnose and correct a faulty transducer condition whether it is an external or an internal problem in the electronic circuitry.

Yet a further object of this invention is to provide a novel vehicle transducer health and offset calibration processing arrangement which uses pattern fault recognition which is based upon specific failure characteristics of each of the transducers and its associated electronics and intelligent diagnostic matrix which uses the acknowledged transducer signal faults to determine the operational status of the overall system transducer interface.

Still another object of this invention is to provide a transducer health and offset calibration processing system for a railway vehicle comprising, correction function means connected to a stuck/dragging brake signal terminal, a brake command terminal, and a power/brake trainline terminal, a latch means and a health check means connected to a zero speed terminal, a first logic means connected to the zero speed terminal, a snowbrake trainline terminal, and a brake control output terminal, a second logic means connected to an output of the first logic means and to a highest axle rate terminal, a rate determining means connected to the axle rate terminals of the railway vehicle, a pressure check means and a signal generator means connected to a truck brake cylinder pressure terminal, the signal generator means, a health check means, and the correction function means connected to a timer input signal terminal, an initialization function connected to a cold start terminal, the rate determining means having an output connected to said second logic means, the second logic means having an output connected to enable function means, the latch means having an output connected to said enable function means, the enable function means having an output connected to the latch means, a calculation function means, the initialization function means, and a code generator means, the code generator means having an output connected to the health check means, the health check means having an output connected to said pressure check means, said signal generator means, said code generator means and a determination matrix means, the determination matrix having a first output connected to an event interface file terminal, a second output connected to a seven-segment display terminal, and a third output to an RAM fault log terminal, the initialization function means having an output connected to the correction function means and to a previous offset terminal, and the correction function means having an output connected to a corrected brake cylinder pressure terminal.

DESCRIPTION OF THE DRAWINGS

The above objects and other attendant features of the present invention will become more readily apparent when combined in conjunction with the detailed description and the accompanying drawings wherein:

FIG. 1A is disposed to the left, FIG. 1B is situated in the center, and FIG. 1C is disposed to the right, for use on a multiple-truck railway vehicle.

DETAILED DESCRIPTION OF THE INVENTION

Figure 1A:
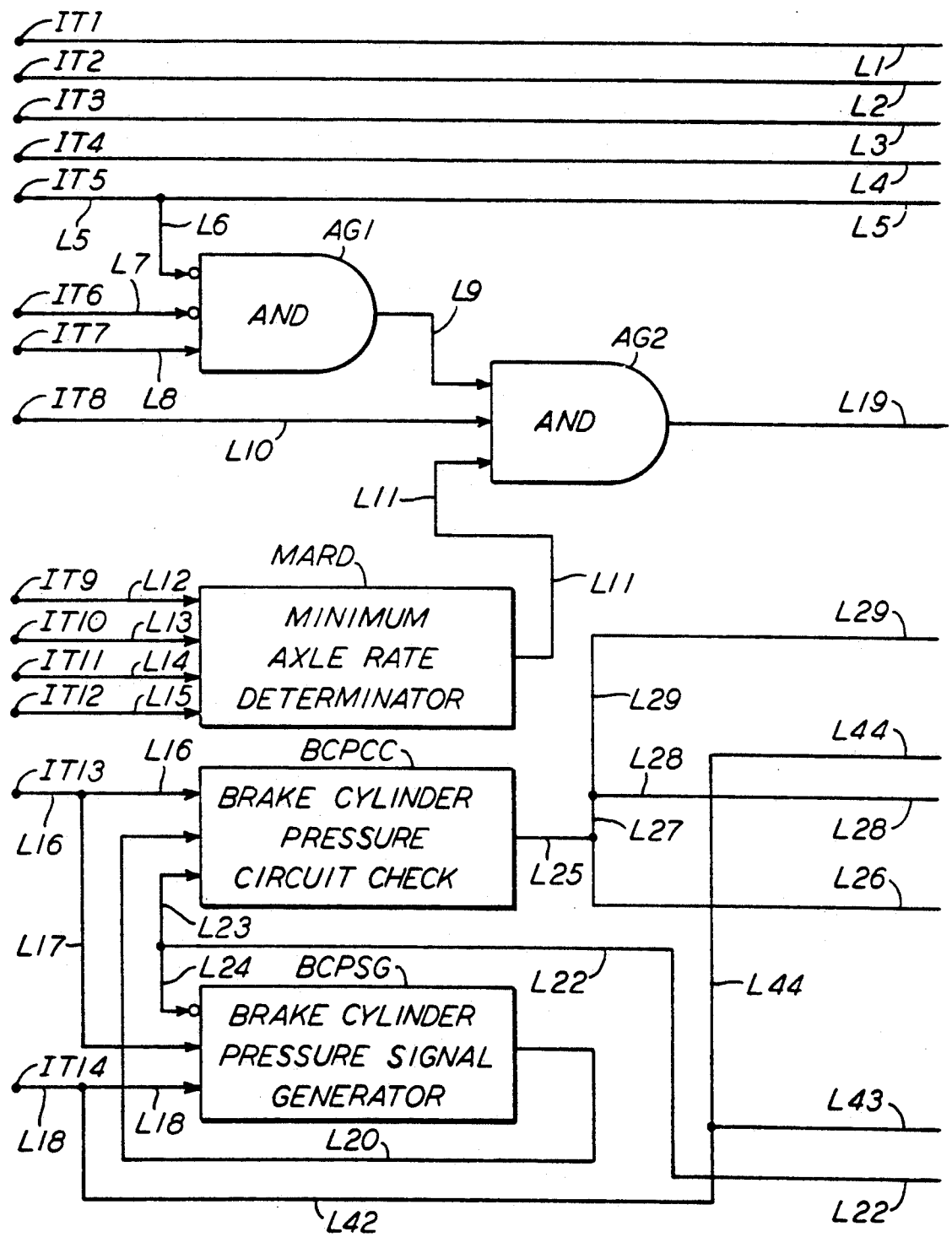
FIGS. 1A, 1B and 1C illustrate a schematic circuit block diagram of an electronic transducer health and offset calibration processing system which, when placed in side-by-side relationship, namely, when
Figure 1B:
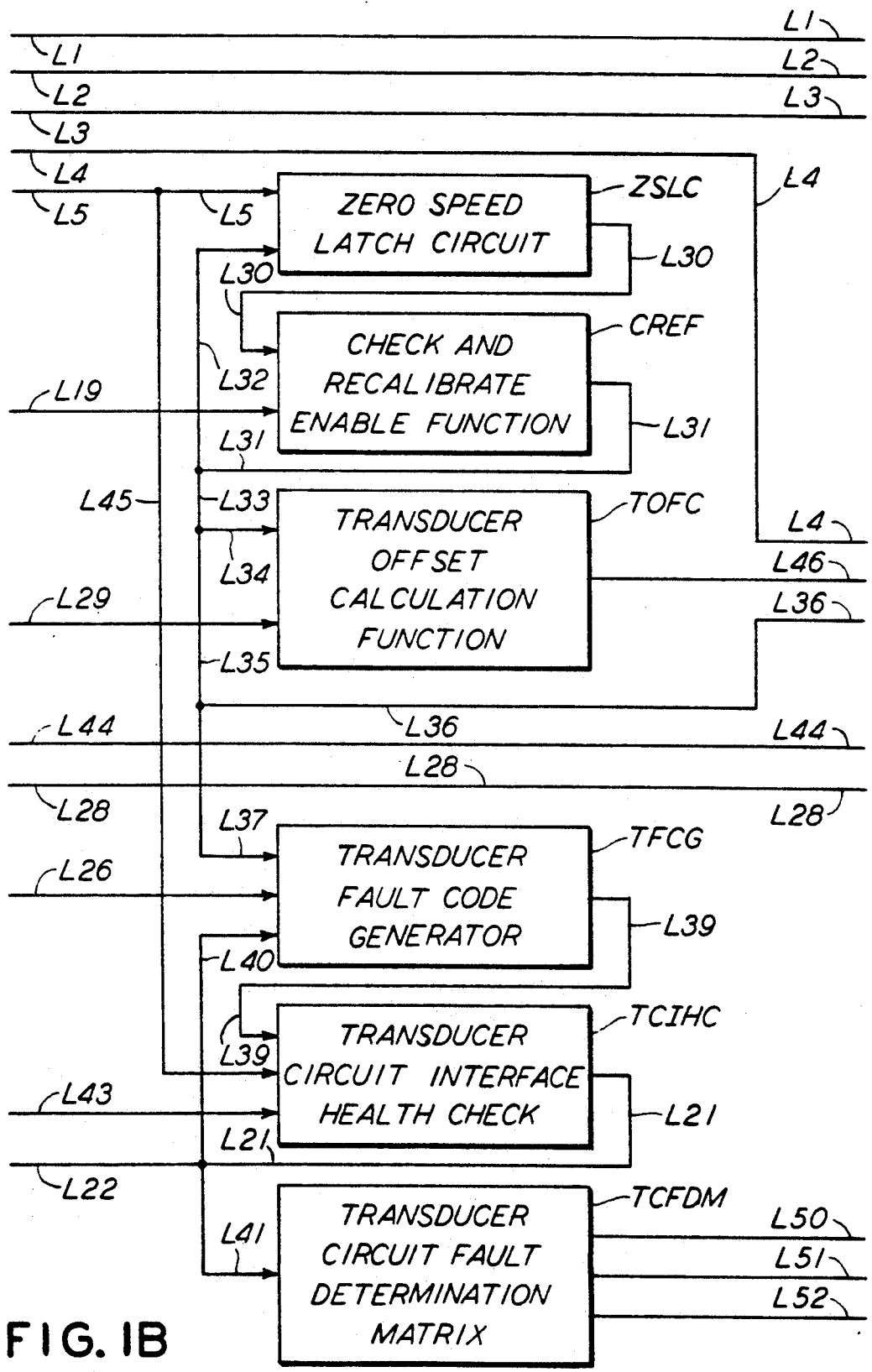
Figure 1C:
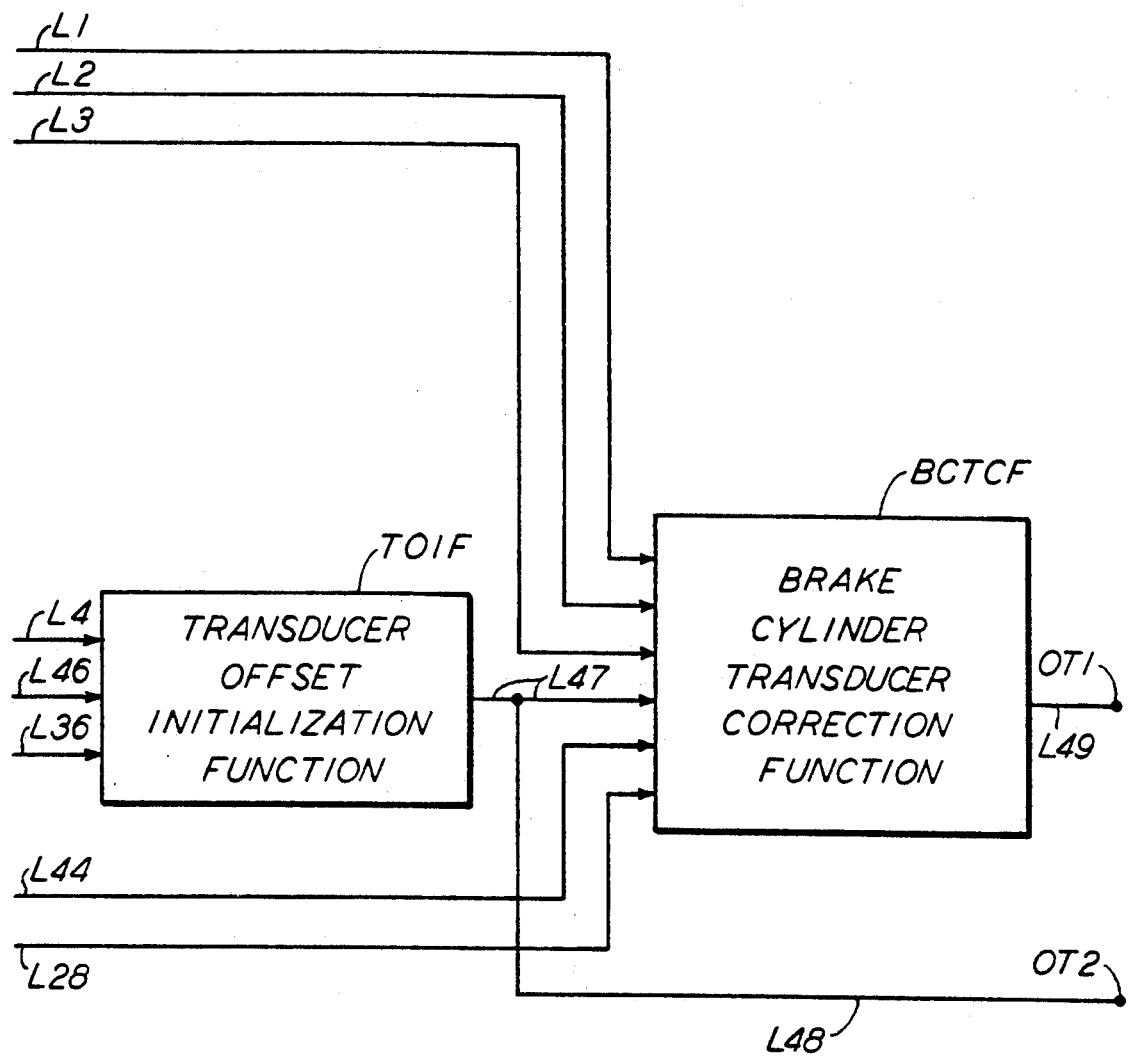

Referring now to the drawings and, in particular, to FIGS. 1A, 1B, and 1C, there is shown a schematic circuit block diagram of a transducer health and offset calibration system for use on a multiple-axle railway vehicle in accordance with the present invention. It will be appreciated that the transducer health and offset calibration circuit arrangement includes a pair of AND logic circuits which are suitably interconnected with a plurality of appropriate electronic circuits for performing the unique functional operation of the subject invention.

As shown in FIG. 1A, a plurality of input terminals IT1-IT14 are used to process appropriate electrical signals by employing intelligent pattern fault recognition and time varying fault tolerance to provide a comprehensive check of the transducer signal interface used by the friction brake and wheel slip control apparatus. In practice, the transducer health and offset calibration circuit performs the functional and operational check by polling or by systematically interrogating the input signals of the respective transducers in order to determine the present operational status of each of the transducer inputs. As will be evident hereinafter, it is important to note that the polling process is only performed when certain states or conditions exist.

For example, if a signal fault is detected, the transducer health and offset calibration circuit initially monitors the zero speed input signal to determine if a state of transition has occurred. Accordingly, when a transition occurs, the transducer health and offset calibration system will immediately disable the faulty transducer signal for a given or specified period of time and will cause the input signal to remain unchanged. That is, when this transducer test occurs, the output of the transducer is not modified and the signal of the transducer remains at the same output level which corresponds to the same or existing pressure level which was present before the test was initiated. In operation, the transducer health and offset calibration circuit can readily diagnose and determine if the problem originated with the signal supplied by the transducer is external or if the problem is internal with the transducer input circuitry. In practice, the output status of the transducer signal, namely, a fault signal, is supplied to the input of an intelligent diagnostic matrix circuit. Thus, the matrix circuit effectively determines the present status of the transducer input signal that are employed in the present system.

In viewing FIG. 1A, it will be seen that the logical input signal on terminal IT1 is derived from a stuck or dragging brake transducer or sensor which produces a low or a logical "0" when no stuck or dragging brake is diagnosed and which produces a high or a logical "1" when a stuck or dragging brake is diagnosed.

It will be seen that the brake command signal on terminal IT2 is representative of a given requested brake rate for the railway vehicle. This input signal varies from a numerical value of zero (0) which signifies a full brake release condition, through a numerical progression up to a value of two hundred and fifty-five (255) which is representative of a full brake application condition.

It will be appreciated that the signal developed on power/brake trainline terminal IT3 annunciates and signifies if the vehicle or train is in a power or brake mode. If the power/brake trainline signal on terminal OT3 is a low or a logical "0", the vehicle is in a brake mode, and if the power/brake trainline signal on terminal OT3 is a high or a logical "1", the vehicle is in a power mode of operation.

As shown in FIGS. 1A, 1B, and 1C, the stuck or dragging brake terminal IT1, the brake command terminal IT2, and the power/brake trainline IT3 are connected to three different inputs of a brake cylinder transducer correction function circuit BCTCF which will be described in greater detail hereinafter. It will be seen that the logical signal developed on input terminal IT4 is connected via lead L4 to one input of a transducer offset initialization function circuit TOIF which will be described in detail hereinafter. The signal produced on input terminal IT4 is an internally derived signal which annunciates and signifies whether the electronic package on the vehicle is in a cold start mode or condition or whether the electronic package on the vehicle is in a warm start mode or condition. If the signal on the cold start terminal IT4 is a low or a logical "0", the vehicle is in a warm start mode, and if the numerical signal value on the cold start terminal IT4 is a high or a logical "1", the vehicle is in a cold start mode.

It will be observed that a zero speed input terminal IT5 is connected to one input of a zero speed latch circuit ZSLC via lead L5 and is also connected to one input of a first three-input AND logic gate circuit AG1 via leads L5 and L6. It will be seen that the input signal to the AND gate AG1 is inverted as signified by the circular inversion symbol. The logical signal on the zero speed terminal IT5 is a high or a logical "1" when the vehicle is in a zero speed condition, namely, the brakes are applied and the car speed is at zero miles per hour (0 mph) for at least a ten (10) second time period. On the other hand, the zero speed signal is a low or a logical "0" for all other conditions.

As shown in FIG. 1A, a snowbrake trainline signal is developed on input terminal IT6 which is connected to the second input of the first three-input AND gate AG1 via lead L7. The signal developed on the snowbrake trainline terminal OT6 is inverted as signified by the circular inversion symbol. The snowbrake trainline signal is produced by an external supply unit which annunciates and signifies whether the vehicle is in a snowbrake mode of operation or is not in a snowbrake mode of operation. The logical signal on the snowbrake trainline terminal IT6 is a low or a logical "0" when there is no snowbrake request, and terminal IT6 is at a high or a logical "1", where there is a requested snowbrake mode of operation. The third input to the first three-input AND gate circuit AG1 is connected to a brake control output terminal IT7 via lead L8. The output signal of the brake control force motor unit is an internally generated signal. The signal annunciates and signifies the level of the requested braking effort by the brake control portion. In practice, if the level of the requested braking effort is less than four hundred and sixty-two milliamperes (462 ma), namely, two hundred and thirty-one (231) bits, the numerical output signal value is a low or logical "0" which signifies an in-application state or condition. Conversely, if the level of the requested braking effort is greater than or equal to 462 ma, then the numerical output signal value is a high or logical "1" which signifies a full brake release state or condition. It will be seen that the output of the first three-input AND gate circuit AG1 is connected to one input of a second three-input AND logic gate circuit AG2 via lead L9.

The second input to the second three-input AND logic gate AG2 is connected to the highest axle speed terminal IT8 via lead L10. The highest axle speed signal is internally generated by a logic sensor. The signal on input terminal IT8 is determined by the highest prevailing speed registered by a given axle on the railway vehicle. If the highest axle speed is less than 15 mph, the input signal on terminal IT8 is a low or a logical "0" and, conversely, if the highest axle speed is greater than or equal to 15 mph, the signal on input terminal IT8 is a high or a logical "1". The third input of the three-input AND gate AG2 is connected by lead L11 to the output of a minimum axle rate determinator circuit MARD which will be described presently.

It will be seen that the minimum axle rate determinator MARD is connected to four input terminals IT9, IT10, IT11 and IT12 via leads L12, L13, L14 and L15, respectively. The input signal on terminal IT9 represents the axle rate of the No. 1 axle on the vehicle while the input signal on terminal IT10 signifies the axle rate of the No. 2 axle on the vehicle. Similarly, the input signal on terminal IT11 signifies the axle rate of the No. 3 axle on the railway vehicle, while the input signal on terminal IT12 represents the axle rate of the No. 4 axle on the vehicle. Each of the axle rate signals is derived by differentiating the respective speed signals which are externally produced by the velocity pickup units associated with each of the axles of the railway vehicle. Each of the axle rate signals varies from a numerical value of zero (0) which represents the maximum deceleration rate which can be sensed on the vehicle through a value of two hundred and fifty-five (255) which represents the maximum acceleration rate which can be sensed on the railway vehicle.

In viewing FIG. 1A, it will be noted that the input terminal IT13 is a brake cylinder transducer signal and is connected by lead 16 to one input of a brake cylinder pressure circuit check BCPCC and to a first input of a brake cylinder pressure signal generator BCPSG via leads L16 and L17. It will be seen that the input terminal IT14 is a timing signal and is connected by lead L18 to another input of the brake cylinder pressure signal generator BCPSG. The details of the brake cylinder pressure circuit check BCPCC and of the brake cylinder pressure signal generator BCPSG will be described hereinafter.

As previously noted, the three input signals that are supplied to the first three-input AND gate AG1 are produced the zero speed sensor, the snowbrake trainline unit, and the brake control force motor control unit. As mentioned above, the two input signals on terminals IT5 and IT6 receive from the zero speed sensor and the snowbrake trainline unit are inverted so that the reciprocal of the signals are delivered to the first AND gate AG1. If the inverted input signal supplied to the one input of the AND gate AG1 is a high or a logical "1" during the absence of a zero speed condition, and the inverted input signal supplied to the second input of the AND gate AG1 is a high or a logical "1" since there is no snowbrake request. Under this condition, if the brake control unit is a high or a logical "1", then the output or lead L9 of the first AND gate circuit AG1 is a high or a logical "1". It will be appreciated that for any other combination of input signals, the logical output on lead L9 of the first AND gate AG1 is a low or a logical "0".

As noted above, if the inputs to the second AND gate AG2 which are supplied by the output of the first AND gate AG1 is a high or a logical "1", the output of the highest axle speed is a high or a logical "1" since the vehicle speed is equal to or greater than 15 mph, and the output of the minimum axle rate discriminator MARD is a high or a logical "1" since all the axles on the vehicle are accelerating at a rate of at least one mile per hour per second (1 mphps), then the output on lead L18 of the AND gate AG2 is a high or a logical "1". It will be understood that any other combination of inputs the output on lead L19 of the second AND gate AG2 will be a low or a logical "0".

Referring again to the brake cylinder pressure circuit check block BCPCC, it will be seen that in addition to the one input furnished on terminal IT13 by the truck brake cylinder pressure unit that there are two other inputs supplied to the brake cylinder pressure circuit check block BCPCC. One of the two other inputs is supplied from the output of the brake cylinder pressure signal generator BCPSG via lead L20 while the other of the two inputs is supplied from the output of a transducer circuit interface health check circuit TCTHC via leads L21, L22 and L23 and is also supplied to a third input of the brake cylinder pressure signal generator BCPSG via leads L21, L22 and L24. As shown, the output of the brake cylinder pressure circuit check block BCPCC is connected to the input of a transducer fault code generator circuit or block TFCG via leads L25 and L26 and also is connected to the input of the brake cylinder transducer correction function block BCTCF via leads L25, L27 and L28. In addition, the output of the brake cylinder pressure circuit check block BCPCC is connected to the input of a transducer offset calculation function circuit TOFC via leads L25, L27 and L29.

As noted in FIG. 1B, the output of the zero speed latch circuit ZSLC is connected to a second input of the check and recalibration enable function circuit CREF via lead L30 while the output of the check and recalibrate enable function circuit CREF is connected to the second input of the zero speed latch circuit ZSLC via leads L31 and L32. Further, it will be noted that the output of the check and recalibration enable function block CREF is connected to the input of the transducer offset calculation function block TOFC via leads L31, L33 and L34 and is connected to the input of the transducer offset initialization function block TOIF via leads L31, L33, L35 and L36. In addition, the output of the check and recalibration enable function block CREF also is connected to the input of the transducer fault code generator block TFCG via leads L31, L33, L35 and L37.

It will be seen that the output of the transducer fault code generator block TFCG is connected to an input of the transducer circuit interface health check circuit TCIHC via lead L39. The output of the transducer circuit interface health check block TCIHC is connected to the input of the transducer fault code generator block TFCG via leads L21 and L40 and also is connected to the input of a transducer circuit fault determination matrix TCFDM via leads L21 and L41.

It will be seen that the input terminal IT14 is connected to an input of the transducer circuit interface health check circuit via leads L18, L42 and L43 and also is connected to an input of the brake cylinder transducer correction function block BCTCF via leads L18, L42 and L44. Further, the input terminal IT5 is connected to an input of the transducer circuit interface health check circuit TCIHC via leads L5 and L45

In viewing FIGS. 1B and 1C, it will be observed that the output of the transducer offset calculation function circuit TOFC is connected to the input of the transducer offset initialization function circuit TOIF via lead L46 while the output of the transducer offset initialization function block TOIF is connected to the input of the brake cylinder transducer correction function block BCTCF via lead L47 and also is connected to the output terminal OT2 which is connected to a previous offset storage device via leads L47 and L48. As shown in FIG. 1C, the output of the brake cylinder transducer correction function block BCTCF is connected by lead L49 to the output terminal OT1 which is connected to the corrected brake cylinder pressure logic circuit. It will be noted that the transducer circuit fault determination matrix produces three outputs which are connected to output terminals OT3, OT4 and OT5 by leads L50, L51 and L52, respectively. The first output terminal OT3 is connected to the event interface file while the second output terminal OT4 is connected to the random access memory (RAM) fault logs. Finally, the third output terminal is connected to the seven (7) segment display of the present system.

As previously noted, the input signals of terminals IT5 and IT6 which are received from the zero speed sensor and snowbrake trainline function sensor are inverted which reverses the state of binary signals before they are applied to the AND gate AG1. In practice, the third input terminal IT7 is a high or a logical "1" when the brake control output signal indicates that the vehicle brake effort request is in a brake release condition. Accordingly, when a snowbrake operation is not requested and a zero speed condition is not present while the brake control output exhibits a release state, the output of the AND gate AG1 will be a high or a logical "1". Conversely, the AND gate AG1 outputs a low or a logical "0" if the binary input signals form any other combination.

As previously noted, the output of the first AND gate AG1 is conveyed to the first input of the second AND gate AG2 while the second input of the second AND gate AG2 receives a logical input signal from the highest axle speed sensor. The internally generated highest axle speed signal is a logical "1" when the highest axle speed is greater than or equal to 15 mph and is a logical "0" when the axle speed is less than 15 mph. The third input to the second AND gate AG2 is received from the output of the minimum axle rate determination block MARD. In practice, the output of the minimum axle rate determinator circuit is a logical "1" when the minimum acceleration rate of all four axles is greater than or equal to 1 mphps and if not, the output is a logical "0". Accordingly, the output of AND gate AG2 is a logical "1" when the signal received from the AND gate AG1 is a logical "1", when the signal received from the highest axle speed sensor is a logical "1" and when the signal received from the minimum axle rate determinator is a logical "1". If any of the inputs is a logical "0", the output of the AND gate AG2 is a low or a logical "0".

As previously mentioned, the first input signal supplied to the brake cylinder pressure circuit check block BCPCC is produced by an external pressure transducer which represents the present pressure level in the brake cylinder on the truck. In practice, this first signal varies from a numerical value of zero (0) which represents no pressure in the brake cylinder through a value of two hundred and fifty-five (255) which represents the maximum readable pressure in the cylinder. The second input signal supplied to the brake cylinder pressure circuit check block BCPCC is derived from the output of the brake cylinder pressure signal generator block BCPSG. The input received from the brake cylinder pressure signal generator BCPSG is equivalent to zero (0) psi for sixty millisecond (60 ms) followed by a signal equivalent to 100 psi for an additional 60 ms. The third input signal received from the transducer circuit interface health check block TCIHC is normally a low or logical "0" until the zero speed signal on terminal IT5 undergoes a transition from a low or logical "0" to a high or logical "1". After the transition, the transducer circuit interface health check circuit TCIHC outputs a high or logical "1" for a 120 millisecond time period after which it reverts to a low or logical "0". Thus, brake cylinder pressure circuit check block BCPCC outputs the truck brake cylinder pressure signal which is either the actual input signal or the test input signal to the transducer offset calculation function circuit TOFC, the transducer fault code generator circuit TFCG and the brake cylinder transducer correction function circuit BCTCF. When this test occurs, the truck brake cylinder pressure signal supplied to the brake control portion is not modified so that the output remains at the same level as before the initialization of the test.

The first input to the brake cylinder pressure signal generator block BCPSG is an inverted input received from the transducer circuit interface health check circuit TCIHC which will be a low or logical "0" until there is a transition from a low or a logical "0" to a high or a logical "1" of the zero speed input signal. After the transition, the transducer circuit interface health check circuit outputs a high or a logical "1" for a 120 millisecond time period and then it reverts to a low or a logical "0". The timer input signal on lead L18 is an internally generated signal which provides a consistent timing source for the associated circuitry. As previously noted, the truck brake cylinder pressure input on terminal IT13 is an externally supplied signal produced by the pressure transducer on the truck. This input signal provides the present level of the pressure found in the brake cylinder on the truck of the vehicle. The signal varies from a numerical zero (0), namely, when there is no pressure in the brake cylinder, through a value of two hundred and fifty-five (255) which is the maximum readable pressure in the brake cylinder. The brake cylinder pressure signal generator circuit BCPSG monitors the inverted input received from the transducer circuit interface health check block TCIHC for a transition from a high or a logical "1" to a low or a logical "0". When the transition occurs, the brake cylinder pressure signal generator block BCPSG generates a signal equivalent to zero (0) psi for 60 milliseconds and then generates a signal equivalent to 100 psi for an additional 60 milliseconds. It will be appreciated that the input on terminal IT14 is used to provide the necessary timing of the required output time limits. Now when the transducer circuit interface health check circuit TCIHC undergoes a transition from a low or a logical "0" to a high or a logical "1", the brake cylinder pressure signal generator circuit BCPSG produces an output which corresponds to the existing value of the truck brake cylinder pressure input signal on terminal IT13.

It will be appreciated that the zero speed input developed on terminal IT5 is an internally produced signal which reports or annuniciates that the vehicle is in a zero speed condition, namely, the brakes are applied and the vehicle is at zero speed for at least a ten (10) second time period. It will be seen that the input from the check and recalibrate enable function block CREF will be a high or a logical "1" when the proper conditions exist so as to facilitate calibration of the transducer offset value. If these conditions are not present, the input received from the check and recalibrate enable function block CREF will be a low or a logical "0". The zero speed latch circuit ZSLC monitors the input signal received on the zero speed input signal on terminals IT5 for a transition from a low or a logical "0" to a high or a logical "1". When this transition occurs, the zero speed latch circuit ZSLC outputs a high or a logical "1" until the input signal from the check and recalibrate enable function circuit CREF undergoes a transition from a low or a logical "0" to a high or logical "1" which is used as a reset pulse. When the transition of the check and recalibrate enable function block CREF occurs, the zero speed latch circuit outputs a low or a logical "0". The zero speed latch circuit ZSLC outputs either a high or a logical "1" or a low or a logical "0" to the check and recalibrate enable function circuit CREF dependent upon the input conditions of the zero speed signal and of the check and recalibrate enable function circuit CREF.

Turning now to the check and recalibrate enable function circuit CREF, it will be noted that the input received from the AND gate AG1 is a high or a logical "1" when the input received from the highest axle speed is a high or a logical "1", namely, the axle speed is greater than or equal to 15 mph, the input from the minimum axle rate determinator MARD is a high or a logical "1", namely, all of the axle acceleration rates on the vehicle are greater than 1 mphps, and the input from the AND gate AG1 is a high or a logical "1". For any other conditions, the input received from the AND gate AG2 is a low or a logical "0". It will be seen that the input on lead L30 which is received from the zero speed latch circuit ZSLC is a high or a logical "1" after a transition of the zero speed input signal. The zero speed latch circuit ZSLC input signal remains high until it is reset by the check and recalibrate enable function block CREF. The check and recalibrate enable function circuit CREF monitors the output from the zero speed latch circuit ZSLC for a transition from a low or a logical "0" to a high or logical "1". The function of the input transition by the zero speed latch circuit block ZSLC is to limit the transducer recalibration to once each time that certain conditions exist. When the transition occurs, the check and recalibrate enable function block CREF monitors the input from the AND gate AG2 for a high or a logical "1". The high or logical "1" signifies and annunciates that the vehicle is in a state where the system brake request is for a full release condition. Thus, when this transition of the AND gate AG2 occurs, the check and recalibrate enable function outputs a high or a logical "1". For any other set of conditions, the check and recalibrate enable function block CREF will output a low or a logical "0". The check and recalibrate enable function circuit CREF produces a high or a logical "1" when the input received from the zero speed latch circuit ZSLC is a high or a logical "1" and the input received from the second AND gate AG2 is a high or a logical "1". As shown, the high or logical "1" of the check and recalibrate enable function block CREF is fed to the inputs of the zero speed latch circuit ZSLC, the transducer offset calculation function circuit TOCF, the transducer fault code function circuit TFCG, and the transducer offset initialization function circuit TOIF. It will be appreciated that for any other set of conditions, the output of the check and recalibrate enable function block CREF is a low or a logical "0".

It will be seen that one input of the transducer offset calibration function block TOCF is supplied by the brake cylinder pressure circuit check block BCPCC. The input from the brake cylinder pressure circuit check block BCPCC is either equal to the present value of the truck brake cylinder pressure signal on terminal IT13 or equal to the test input value produced by the brake cylinder pressure signal generator block BCPSG. The truck brake cylinder pressure signal varies from a numerical value of zero (0), namely, there is no pressure in the brake cylinder, through a value of two hundred and fifty-five (255), namely, a maximum readable pressure in the brake cylinder. The other input of the transducer offset calculation function circuit TOCF is supplied by the check and recalibrate enable function block CREF. The input from the check and recalibrate enable function circuit CREF is a high or a logical "1" when the output of the second AND gate AG2 is a high or a logical "1" and the output from the zero speed latch circuit ZSLC is a high or a logical "1". The output from the check and recalibrate enable function block CREF is a low or a logical "0" for any other set of conditions. The transducer offset calibration function circuit TOFC monitors the output of the check and recalibrate enable function block CREF for a transition from a low or a logical "0" to a high or a logical "1". When the transition of the check and recalibrate enable function circuit CREF occurs, the transducer offset calibration function block TOCF calibrates a new transducer offset value for the specific system transducer. The new offset is equal to the present value of the input received from the brake cylinder pressure circuit check block BCPCC. It will be understood that only positive number offset are permitted. The transducer offset calibration function circuit TOCF supplies the newly calibrated transducer offset value to one input of the transducer offset initialization function block TOIF.

As shown, the transducer fault code generator circuit TFCG has three inputs supplied by the check and recalibrate enable function block CREF, the brake cylinder pressure circuit check block BCPCC and the transducer circuit interface health check block TCIHC. The input received from the check and recalibrate enable function circuit CREF is a high or a logical "1" when the output of the second AND gate AG2 is a high or logical "1" and the output of the zero speed latch circuit ZSLC is a high or a logical "1". The input supplied to the check and recalibrate enable function circuit CREF is a low or a logical "0" for any other set of input conditions. The input received from the transducer circuit interface health check block TCIHC is a low or a logical "0" until the zero speed input on terminal IT5 undergoes a low or a logical "0" to a high or a logical "1" transition. After the transition, the transducer circuit interface health check circuit TCIHC supplies a high or a logical "1" for a 120 millisecond time period. After the expiration of the 120 millisecond time period, the output of the transducer circuit interface health check circuit TCIHC reverts to a low or a logical "0". The input received from brake cylinder pressure circuit check block BCPCC is either the present value of the existing truck brake cylinder pressure or the test value input produced by the brake cylinder pressure signal generator BCPCC. The truck brake cylinder pressure signal developed on terminal IT13 varies from a numerical value of zero (0), which signifies that the pressure in the brake cylinder is at a zero level, to a numerical value of two hundred and fifty-five (255), which signifies that the pressure in the brake cylinder is at the maximum readable level. The transducer fault code generator circuit TFCG monitors the input signal received from the check and recalibrate enable function block CREF for a transition from a low or logical "0" to a high or logical "1". when the transition occurs, the transducer fault code generator circuit TFCG analyzes the input signal received from the brake cylinder pressure circuit check block BCPCC, namely, the truck brake cylinder pressure signal on input terminal IT13. The transducer fault code generator circuit TFCG processes the signal information employing the fault matrix shown in the following table IV to determine and annunciate the appropriate system fault code.

TABLE IV

| TRANSDUCER OFFSET FAULT MATRIX | | | |
|---|---|---|---|
| PATTERN | Low Off | High Off | FAULT |
| 1 | High | High | NP/GCF |
| 2 | High | Low | LOTF |
| 3 | Low | High | HOTF |
| 4 | Low | Low | NO FAULT |

The transducer offset fault matrix mnemonics for the lowest level replaceable unit (LLRU) are as follows:

| ACRONYM | DESCRIPTION |
|---|---|
| NP | Condition is NOT Possible |
| GCF | General Circuit Fault |
| LOTF | Low Offset Transducer Fault |
| HOTF | High Offset Transducer Fault |

In addition, the transducer fault code generator circuit TFCG monitors the input received from the transducer circuit interface health check circuit TCIHC for ascertaining if a transition from a low or a logical "0" to a high or a logical "1" has occurred. When the transition occurs, the transducer fault code generator circuit TFCG analyzes the input signal received from the brake cylinder pressure circuit check block BCPCC. Again, the transducer fault code generator circuit TFCG processes the signal information and employs the fault matrix shown in the following table I, table II, and table III.

TABLE I

| CIRCUIT COMPARISON FAULT MATRIX | | | |
|---|---|---|---|
| PATTERN | Pressure | 100 PSIG | FAULT |
| 1 | High | High | GCF |
| 2 | High | Low | TLC |
| 3 | Low | High | GCF |
| 4 | Low | Low | NO FAULT |

The Circuit Comparison Fault Matrix Mnemonics for the lowest level replaceable unit (LLRU) are as follows:

| ACRONYM | DESCRIPTION |
|---|---|
| TLC | Transducer Linearity Check |
| GCF | General Circuit Fault |

TABLE II

| TRANSDUCER LINEARITY FAULT MATRIX | | | |
|---|---|---|---|
| PATTERN | Pressure | 100 PSIG | FAULT |
| 1 | High | High | SPF |
| 2 | High | Low | TLC1 |
| 3 | Low | High | TLC2 |
| 4 | Low | Low | NO FAULT |

The Circuit Comparison Fault Matrix Mnemonics for the lowest level replaceable unit (LLRU) are as follows:

| ACRONYM | DESCRIPTION |
|---|---|
| TLF1 | Transducer Linearity Fault - Transducer #1 |
| TLF2 | Transducer Linearity Fault - Transducer #2 |
| SPF | Brake Control Portion Fault - Required Static Test |

TABLE III

| CIRCUIT OFFSET FAULT MATRIX | | | |
|---|---|---|---|
| PATTERN | Pressure | 100 PSIG | FAULT |
| 1 | High | High | NP/GCF |
| 2 | High | Low | CDL |
| 3 | Low | High | CDH |
| 4 | Low | Low | NO FAULT |

The Circuit Offset Fault Matrix Mnemonics for the lowest level replaceable unit (LLRU) are as follows:

| ACRONYM | DESCRIPTION |
|---|---|
| NP | Condition is NOT Possible |
| GCF | General Circuit Fault |
| CDL | Circuit Drift Low Fault |
| CDH | Circuit Drift High Fault |

In each applicable case, the fault condition is determined and annunciated to signify the appropriate system fault code. If the transducer linearity check (TLC) error is diagnosed, the transducer fault code generator circuit TFCGC outputs the transducer faults by utilizing the matrix table II in order to determine if the problem is external to the transducer.

It is important to note that the transition of the check and recalibrate enable function circuit CREF and the transition of the transducer circuit interface health check circuit TCIHC are mutually exclusive events. The transition of the check and calibrate enable function block CREF performs a test on the total transducer circuit while the transition of the transducer circuit interface health check block TCIHC performs a test on the internal electronics circuit. As shown, the transducer fault code generator circuit TFCG outputs the appropriate system fault code to the transducer circuit interface health check block TCIHC which are the pattern faults illustrated in Tables I, II, III and IV.

As noted above, the transducer circuit interface health check block TCIHC has three inputs supplied by the zero speed signal developed on terminal IT5, the timer input signal developed on terminal IT14, and the transducer fault code generator circuit TFCG. The zero speed signal is an internally generated signal which annunciates that the vehicle has been in a zero speed condition for at least a ten (10) second time period while the timer input signal is also an internally generated signal which provides a constant timing source for operation of the circuitry. The input derived from the transducer fault code generator circuit TFCG is generated by analyzing the truck brake cylinder pressure signal received from the brake cylinder pressure circuit check block BCPCC. The transducer circuit interface health check circuit TCIHC monitors the input received from the zero speed signal terminal IT5 for determining whether a transition from a low or a logical "0" to a high or a logical "1" has occurred. When the transition occurs, the transducer circuit interface health check block TCHIC produces a high or a logical "1" for a 120 millisecond time period. After 20 milliseconds of the 120 millisecond time period elapse, the transducer circuit interface health check circuit TCHIC monitors the input signal received from the transducer fault code generator circuit TFCG for a low or a logical "0" which signifies that transducer circuit is functioning normally. If the expected low signal condition is not present before the end of the time period, the transducer circuit interface health check circuit TCIHC conveys this information to transducer circuit fault determination matrix as will be described presently. Normally, the transducer circuit interface health check circuit TCIHC conveys a low or a logical "0" to the brake cylinder pressure signal generator block BCPSG and also to the brake cylinder pressure circuit check block BCPCC when the input signal received from the zero speed signal remains in a low or a logical "0" condition. However, if the zero speed input signal undergoes a transition to a high or a logical "1" condition, the transducer circuit interface health check block TCIHC will convey a high or a logical "1" to the brake cylinder pressure signal generator circuit BCPSG and also to the brake cylinder pressure circuit check block BCPCC for a 120 millisecond time period. In addition, the transducer circuit interface health check block TCHIC conveys a high or a logical "1" to transducer circuit fault determination matrix block TCFDM when a transducer offset fault signal is detected. The annunciation of a fault signal on the transducer circuit fault determination matrix block TCFDM occurs when the check and recalibrate enable function circuit CREF undergoes a transition from a low or a logical "0" to a high or a logical "1" or when a zero speed transition exhibits a change from a low or a logical "0" to a high or a logical "1". If the transducer circuit interface health check circuit TCIHC does not detect a fault condition, the output of the transducer circuit fault determination matrix circuit TCFDM will be a low or a logical "0".

It will be seen that the transducer circuit fault determination matrix block TCFDM only has a single input which is connected to the output of the transducer circuit interface health check block TCIHC. The input received from the transducer circuit interface health check circuit TCIHC is a high or a logical "1" when some type of transducer offset fault is present and detected. When the transducer circuit interface health check circuit TCIHC does not sense and annunciate a fault condition, a low or logical "0" is conveyed to the transducer circuit fault determination matrix block TCFDM.

As shown in Table V, the matrix is used by the transducer circuit fault determination matrix circuit TCFDM for determining and analyzing the existing fault conditions. In practice, the transducer circuit fault determination matrix of Table V employs the low level fault conditions produced in Tables I, II, III, and IV to determine a high level transducer offset fault.

TABLE V

| PATTERN | TCFDM FAULT MATRIX | | | FAULT |
|---|---|---|---|---|
| | Low Off | High Off | Circuit | |
| 1 | High | High | High | NP/GCF |
| 2 | High | High | Low | NP/GCF |
| 3 | High | Low | High | CDL |
| 4 | High | Low | Low | LOTF |
| 5 | Low | High | High | CDH |
| 6 | Low | High | Low | HOTF |
| 7 | Low | Low | High | GCF |
| 8 | Low | Low | Low | No Fault |

The TCFDM Matrix Mnemonics for the lowest level replaceable unit (LLRU) are as follows:

| ACRONYM | DESCRIPTION |
|---|---|
| NP | Not Possible Fault |
| LOTF | Low Offset Transducer Fault |
| HOTF | High Offset Transducer Fault |
| CDL | Circuit Drift Low |
| CDH | Circuit Drift High |
| GCF | General Circuit Fault |

Thus, the transducer circuit fault determination matrix block TCFDM outputs each of the specific transducer faults generated by the TCFDM matrix. As previously mentioned, the various faults form the outputs for the event interface file, the RAM fault logs and the seven segment display which are connected to output terminals OT3, OT4 and OT5, respectively.

It will be noted that the transducer offset initialization function block TOIF has three inputs which are supplied by the cold start input signal on terminal IT4, the transducer offset calculation function circuit TOFC and the check and recalibrate enable function circuit CREF. The state of the cold start input signal is determined by an internally responsive signal unit. The unit produces an appropriate signal which signifies and annunciates whether the electronic package carried by the vehicle is in a cold start mode or in a warm start mode. The signal assumes one of two states which is either a low or a logical "0" signifying a warm start condition or a high or a logical "1" signifying a cold start condition. As noted above, the check and recalibrate enable function block CREF outputs a high or a logical "1" when the output received from the AND gate AG2 is a high or a logical "1" and the output received from the zero speed latch circuit ZSLC is a high or a logical "1". The high or logical "1" condition connotes that the conditions are such that it is necessary to establish a new transducer offset value. The input received from the check and recalibrate enable function circuit CREF is a low or a logical "0" for any other set of conditions. The input received from the transducer offset calculation function block TOFC is dependent upon the calculated transducer offset value which is used in determining the value of the calculated brake cylinder pressure. The transducer offset initialization function circuit TOIF monitors the cold start input signal for the occurrence of a transition from a low or logical "0" to a high or a logical "1". When the transition occurs, the transducer offset initialization function block TOIF resets the transducer to exhibit a system default of eight (8) psi. Additionally, the transducer offset initialization function circuit TOIF monitors the check and recalibrate enable function block CREF for the occurrence of a transition from a low or a logical "0" to a high or a logical "1". When the transition of the check and recalibrate enable function block CREF occurs, the transducer offset initialization function circuit TOIF resets the transducer offset to the given input value being received from the transducer offset calibration function circuit TOFC. It is of importance to note that the offset value obtained in this process is employed in calculating the brake cylinder pressure until a new offset value is procured. When the new offset value is obtained, the previous offset value is retained and conveyed to the previous offset terminal OT2. It will be understood that the transducer offset initialization function circuit TOIF establishes the priority of the transducer offset value determination. If the system is undergoing a cold start condition, the transducer offset initialization function block TOIF outputs the system default offset which is eight (8) psi. For all other sets of conditions, the transducer offset initialization function block TOIF outputs the input value received from transducer offset calculation function block TOFC. It will be seen that the output of the transducer offset initialization function block TOIF is conveyed to one of the six (6) inputs of the brake cylinder transducer correction function block BCTCF.

As noted above, the brake cylinder transducer correction function circuit BCTCF has six (6) inputs supplied by the stuck/dragging brake signal developed on terminal IT1, the brake command signal developed on terminal IT2, the power/brake trainline signal developed on terminal IT3, the output from the transducer offset initialization function block TOIF, the timer input signal developed on terminal IT14, and the output of the brake cylinder pressure circuit check block BCPCC. As previously noted, the timer input signal is an externally supplied signal which provides a constant timing source for the circuitry. The stuck/dragging brake signal is an internally supplied signal which detects and annunciates to the present system that a stuck and/or dragging brake has been diagnosed by the diagnostics circuitry. The signal varies from a numeral value of zero (0), which signifies that no stuck and/or dragging brake is present, through a value of two hundred and fifty-five (255), which signifies that a stuck and/or dragging brake has been diagnosed. The brake command is an externally supplied signal which is conveyed via a P-wire, a digital trainline, etc., to the system. This signal is the requested brake rate command for the railway vehicle. The signal varies from a numerical value of zero (0), which signifies an emergency brake application through a value of two hundred and fifty-five (255), which impart a full brake release condition. The truck brake cylinder pressure signal is an externally supplied signal which is produced by an appropriate pressure transducer on the truck. This signal provides the present pressure level in the brake cylinder on the truck. The signal varies from a numerical value of zero (0), which signifies that there is no pressure in the brake cylinder, through a value of two-hundred and fifty-five (255) which represents the maximum readable pressure in the brake cylinder. The power/brake trainline input signal is an externally supplied signal which determines and annunciates to the present system as to whether the vehicle is in a power mode or in a brake request mode of operation. The brake cylinder transducer correction function circuit BCTCF monitors the input signals received from the power/brake trainline, the brake command, and truck brake cylinder pressure. If the power/brake trainline input is a high or a logical "1", the brake command input greater than a hundred and fifty two (152) bit value and the corrected brake cylinder pressure is greater than three (3) psi, where the corrected brake cylinder pressure is equal to truck brake cylinder pressure input minus the transducer offset value, for a time period that is greater than 2.90 seconds, the brake cylinder transducer correction function block BCTCF will check the stuck/dragging brake signal to determine if it is in a high or a logical "1" state. If the high or logical "1" condition is not present, then the brake cylinder transducer correction function circuit BCTCF will not re-evaluate the transducer offset value for a possible change but will reset the transducer offset value to the previous offset value. This operating process facilitates the brake release function in order to permit the vehicle to continue to move along its route of travel. Accordingly, the brake cylinder transducer correction function block BCTCF produces an effective corrective brake cylinder pressure value to the control electronics of the present transducer health and offset calibration processing system.

Thus, the present invention uses pattern fault recognition and an intelligent diagnostic matrix in the determination of the operational status of the transducer input signal. The pattern fault recognition is based upon the specific failure characteristics of each of the transducers and its associated electronics which are used on the railway vehicle. The pattern faults are based upon a specific combination of existing input errors before a transducer signal fault is acknowledged. The intelligent diagnostic matrix uses the acknowledged transducer signal faults to determine the operational status of the overall system transducer interface. Accordingly, the combined fault analysis system provides an extremely more accurate detecting and reporting scheme.

Further, the subject invention is capable of differentiating between a circuit relate problem that is internal to the electronic unit versus a problem that is external to the electronic unit so that the required maintenance is greatly simplified for the end user.

As previously noted, the present invention possesses the ability to differentiate between a transducer signal that has drifted in a negative direction versus a transducer signal that has drifted in a positive direction. Once the direction and amount of the transducer drift has been ascertained, the necessary corrective action is undertaken to restore the transducer signal accuracy and integrity for the system applications. Such an operation feature enhances the useful field life of the transducer since it is possible to compensate for variations of transducer output voltage which reduces maintenance and replacement costs.

As noted above, the subject invention is readily capable of intelligently discerning and then taking corrective action that will permit a brake release condition when a brake release state is appropriate. For example, when the cold start function, which normally calibrates the offset for the system fault to facilitate a maintenance condition, causes a recalibration of the offset of a transducer which has an extreme positive drift, it is possible that the input reading from the transducer would fail to exhibit a brake release pressure value. Consequently, the railway vehicle is unable to move and not able to get underway. In practice, the cold start feature provides the necessary temporary corrective action to permit and facilitate the vehicle to get underway.

In addition, the present system provides an artificial intelligent process that monitors the system functions for preventing any erroneous conditions from causing a faulty diagnosis of the transducer interface. Thus, the process can timely alert the end user of a possible problem before any detrimental maintenance condition results to the vehicle.

It will be appreciated that the transducer health and offset calibration process normally functions in a dynamic mode of operation but further has the flexibility to also operate in a static mode of operation. The dynamic mode of operation allows for the continual monitoring of the operational status of the transducer input signals. Thus, the process provides the necessary detailed information for permitting the detection of a specific transducer input signal fault. In practice, the information can then be employed by the end user to diagnose the problem and to initiate the repair or replacement of either the faulty transducer or the transducer interface signal circuitry or both.

It will be understood that the transducer input signals are necessary for properly controlling the operation of the brake control system, the wheel-slip system and the diagnostics of the entire system. The ability to diagnose a faulty transducer can be of assistance to isolate a specific problem area which can aid in eliminating the faulty diagnosis of other problems on the railway vehicle.

In summary, the present invention establishes the following operating functions:

1. Provides a pressure transducer with a zero offset calibration technique.
2. Provides a functional fault analysis of the circuitry associated with the pressure transducer.
3. Provides a functional fault analysis of the transducer acknowledging if the transducer has drifted in a positive or a negative direction.
4. Provides a dynamic pattern fault recognition process for the overall analysis of the pressure transducer.
5. Provides a vehicular limp-in operation by recalibrating the offset drift for permitting a brake release state.
6. Provides a power-up standardization offset for establishing an automatic offset initialization process for maintenance purposes.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

What we claim is:

1. A transducer health and offset calibration processing system for a railway vehicle comprising, correction function means connected to a stuck/dragging brake signal terminal, a brake command terminal, and a power/brake trainline terminal, a latch means and a health check means connected to a zero speed terminal, a first logic means connected to the zero speed terminal, a snowbrake trainline terminal, and a brake control output terminal, a second logic means connected to an output of the first logic means and to a highest axle rate terminal, a rate determining means connected to the axle rate terminals of the railway vehicle, a pressure check means and a signal generator means connected to a truck brake cylinder pressure terminal, the signal generator means, a health check means, and the connection function means connected to a timer input signal terminal, an initialization function connected to a cold start terminal, the rate determining means having an output connected to said second logic means, the second logic means having an output connected to enable function means, the latch means having an output connected to said enable function means, the enable function means having an output connected to the latch means, a calculation function means, the initialization function means, and a code generator means, the code generator means having an output connected to the health check means, the health check means having an output connected to said pressure check means, said signal generator means, said code generator means and a determination matrix means, the determination matrix having a first output connected to an event interface file terminal, a second output connected to a seven-segment display terminal, and a third output to an RAM fault log terminal, the initialization function means having an output connected to the correction function means and to a previous offset terminal, and the correction function means having an output connected to a corrected brake cylinder pressure terminal.

2. The transducer health and offset calibration processing system for a railway vehicle as defined in claim 1, wherein said first logic means is a three-input AND gate circuit.

3. The transducer health and offset calibration processing system for a railway vehicle as defined in claim 1, wherein said second logic means is a three-input AND gate circuit.

4. The transducer health and offset calibration processing system for a railway vehicle as defined in claim 1, wherein correction function means is a brake cylinder transducer correction function circuit which facilitates a brake release function on the railway vehicle for allowing the railway vehicle to move.

5. The transducer health and offset calibration processing system for a railway vehicle as defined in claim 1, wherein said rate determining means is a minimum axle rate determinator circuit which determines if each of the axles on the railway vehicle is accelerating at a rate equal to or greater than a threshold value.

6. The transducer health and offset calibration processing system for a railway vehicle as defined in claim 1, wherein said pressure check means is a brake cylinder pressure circuit check which produces a signal representing a given brake cylinder pressure level.

7. The transducer health and offset calibration processing system for a railway vehicle as defined in claim 1, wherein said signal generator means is a brake cylinder pressure signal generator circuit and produces a specifically generated signal value.

8. The transducer health and offset calibration processing system for a railway vehicle as defined in claim 1, wherein said latch means is a zero speed latch circuit which outputs a given logical signal dependent upon the input condition on the inputs received zero speed terminal and said enable function means.

9. The transducer health and offset calibration processing system for a railway vehicle as defined in claim 1, wherein said enable function means is a check and recalibrate enable function circuit which produces a given logical signal dependent upon said inputs received from the second logic means and said enable function means.

10. The transducer health and offset calibration processing system for a railway vehicle as defined in claim 1, wherein said calculation function means is a transducer offset calculation function circuit which produces a given logical signal dependent upon the inputs received from the second logic means and the latch means.

11. The transducer health and offset calibration processing system for a railway vehicle as defined in claim 1, wherein said code generator means is a transducer fault code generating circuit which supplies an appropriate fault code signal to said health check means.

12. The transducer health and offset calibration processing system for a railway vehicle as defined in claim 1, wherein said health check means is a transducer circuit interface health check circuit which a given logical signal to said determination matrix means when a transducer offset fault is detected.

13. The transducer health and offset calibration processing system for a railway vehicle as defined in claim 1, wherein said determination matrix means is a transducer circuit fault determination matrix which analyzes the given fault conditions and conveys an appropriate signal to said event interface file, said seven segment display, and said RAM fault log.

14. The transducer health and offset calibration processing system for a railway vehicle as defined in claim 1, wherein said initialization function means is a transducer offset initialization function circuit which supplies a new offset value to said correction function means and retains the previous offset value in storage.

* * * * *